W. S. GRAY.
BOTTLE DAM.
APPLICATION FILED JAN. 29, 1910.
960,894.
Patented June 7, 1910.
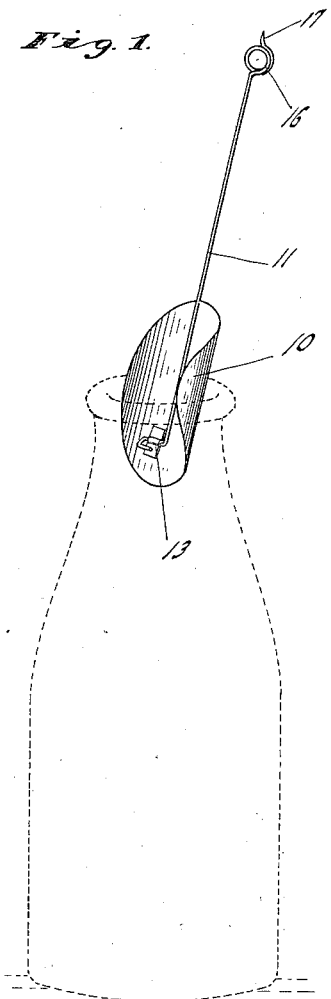
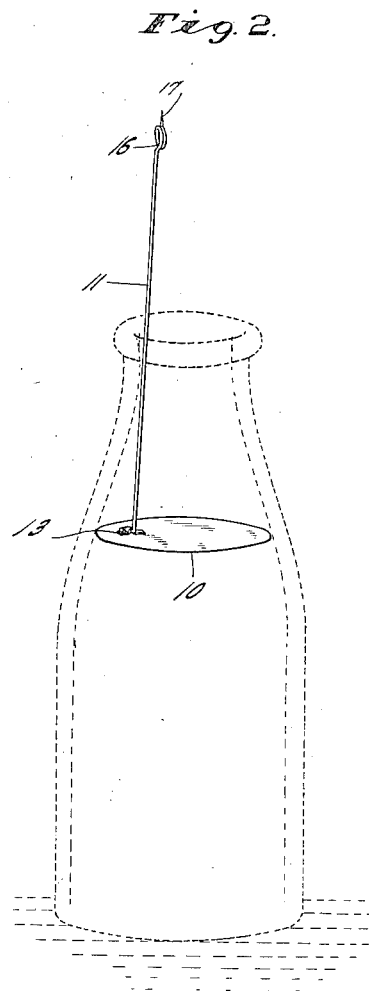
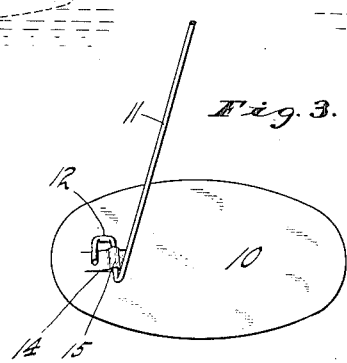
Witnesses
Frank A. Fahl
Thomas W. McMeans
Inventor
Wiltshire S. Gray,
By Bradford Hood
Attorneys

UNITED STATES PATENT OFFICE.

WILTSHIRE S. GRAY, OF INDIANAPOLIS, INDIANA, ASSIGNOR OF ONE-HALF TO GEORGE W. SNYDER, OF INDIANAPOLIS, INDIANA.

BOTTLE-DAM.

960,894.  Specification of Letters Patent.  Patented June 7, 1910.

Application filed January 29, 1910. Serial No. 540,803.

*To all whom it may concern:*

Be it known that I, WILTSHIRE S. GRAY, a citizen of the United States, residing at Indianapolis, in the county of Marion and State of Indiana, have invented a certain new and useful Bottle-Dam, of which the following is a specification.

It is now very common for dealers in milk to deliver the milk at retail in bottles of a well known form, these bottles having comparatively small necks and outlets. When the milk has stood in bottles of this kind for a proper length of time there will, if the milk be good, be a quantity of cream rise to the top which will occupy about one-fourth of the total height of the bottle, the lower level of the cream being thus at a point in the bottle having a diameter somewhere between the small diameter of the outlet and the larger diameter of the main body of the bottle. Under such conditions it is quite difficult to remove the cream from the milk without getting a considerable quantity of the skim milk which lies below the cream.

The object of my invention is to produce a handy and efficient little device by means of which the cream may be readily poured out from the bottle while exit of any material quantity of the less rich milk below the cream is prevented.

The accompanying drawings illustrate my invention.

Figure 1 is a perspective view of my device showing the manner of insertion into a small mouthed bottle; Fig. 2 a similar view showing its position as a dam within the bottle, and Fig. 3 a perspective detail of a slight modification.

In the drawings, 10 indicates a circular sheet of transversely elastic material having, however, sufficient rigidity when supported at its edge to serve as a dam. This plate may be formed of any suitable material, such for instance as very thin sheet steel, or celluloid, etc. In practice, however, I have found that a sheet of very thin steel will produce excellent results, and such material can be readily kept entirely clean and does not impart any taste to the milk or cream. Pivotally secured to one face of sheet 10 is a handle rod 11 provided at its lower end with an arm, stop or finger 12, which will limit the throw of the handle 11 in one direction.

The form of the pivotal connection between the plate 10 and rod 11 is immaterial. In Fig. 1 it is produced by means of a saddle piece 13 brazed or soldered to the face of the sheet 10. In the form shown in Fig. 3 a pair of parallel slits 14 are cut through the body of the sheet, and the body of the sheet is struck up to form a saddle 15 beneath which a portion of rod 11 may be journaled. Rod 11 near its free end is bent into an eye 16 and the projecting tip 17 is sharpened so that this sharpened tip may be used for spearing into the usual fiber or paste-board stopper which is commonly used for closing the bottles, it being possible thereby to readily remove such stopper from the bottle, the eye 16 forming a convenient finger hold.

In operation, the plate 10 will be thrown up against rod 11 and introduced into the mouth of the bottle as clearly indicated in Fig. 1, a slight downward and transverse pressure upon the rod 11 into the mouth of the bottle serving to curl up the sheet 10 so that it may be readily projected into the mouth of the bottle. The plate will be forced down through the cream until it is below that portion of the bottle which is of less diameter than the plate. Thereupon the plate will swing down to a position substantially at right angles to rod 11 and a direct upward pull on the rod will serve to bring the dam plate into the position shown in Fig. 2 where it will lie approximately at the lower level of the cream with its perimeter in contact with the inner face of the wall of the bottle. Thereupon the bottle may be tilted so as to cause the discharge of the cream or other liquid which lies above the dam while the remainder of the liquid below the dam is retained. There may of course be some slight leakage past the dam but the time required for pouring off the cream is comparatively short and a slight leakage will not be at all material.

It will be readily understood that the fundamental feature of my invention resides in the provision of a transversely elastic plate 10 having a diameter exceeding the diameter of the mouth of the bottle or other package and that, while the particular form of handle or other operating member shown in the drawings is probably commercially the best yet, nevertheless, there may be many variations from the form shown without departing from the spirit of my invention.

I claim as my invention:

1. A bottle dam comprising a transversely elastic normally flat plate having a shape adapted to fit an internal diameter of a bottle exceeding the diameter of the bottle mouth, a handle rod pivotally connected to said plate upon an axis substantially parallel with the plate at one side of its center, and means for limiting the swing of said rod on the plate in one direction to a position substantially normal to the plate.

2. A bottle dam comprising a transversely elastic plate having a shape adapted to fit an internal diameter of a bottle exceeding the diameter of the bottle mouth, a handle rod pivotally connected to said plate upon an axis substantially parallel with the plate at one side of its center, and means for limiting the swing of said rod on the plate in one direction to a position substantially normal to the plate.

3. A bottle dam comprising a transversely elastic normally flat plate having a shape adapted to fit an internal diameter of a bottle exceeding the diameter of the bottle mouth, a handle rod pivotally connected to said plate upon an axis substantially parallel with the plate, and means for limiting the swing of said rod on the plate in one direction to a position substantially normal to the plate.

4. A bottle dam comprising a transversely elastic plate having a shape adapted to fit an internal diameter of a bottle exceeding the diameter of the bottle mouth, a handle rod pivotally connected to said plate upon an axis substantially parallel with the plate, and means for limiting the swing of said rod on the plate in one direction to a position substantially normal to the plate.

In witness whereof, I have hereunto set my hand and seal at Indianapolis, Indiana, this twenty-fifth day of January, A. D. one thousand nine hundred and ten.

WILTSHIRE S. GRAY. [L. S.]

Witnesses:
　EDGAR RILEY,
　IRVING P. BLUE.